Sept. 9, 1924.                    H. C. KAY                    1,508,280
                                  PANTOGRAPH
                               Filed May 8, 1923
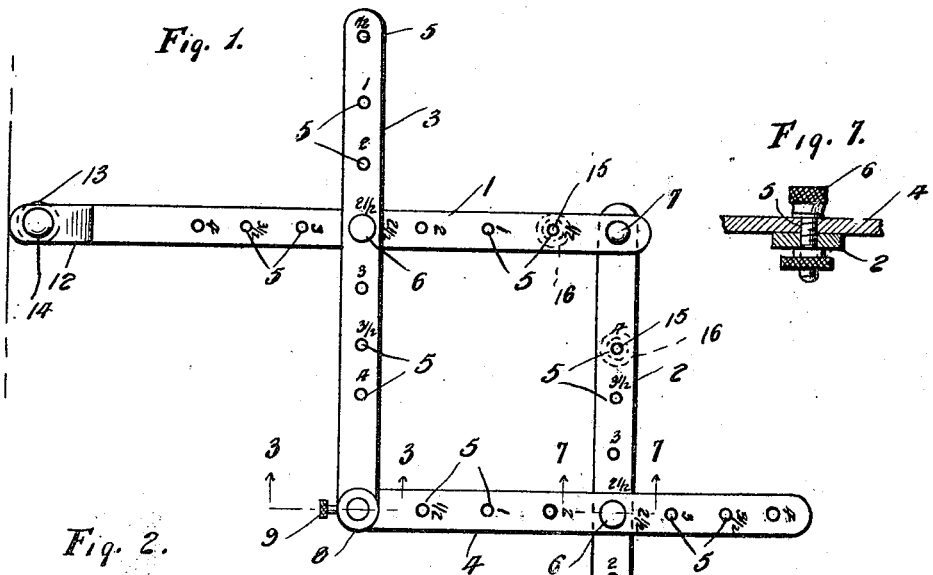
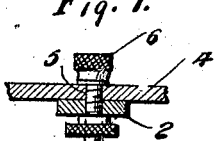
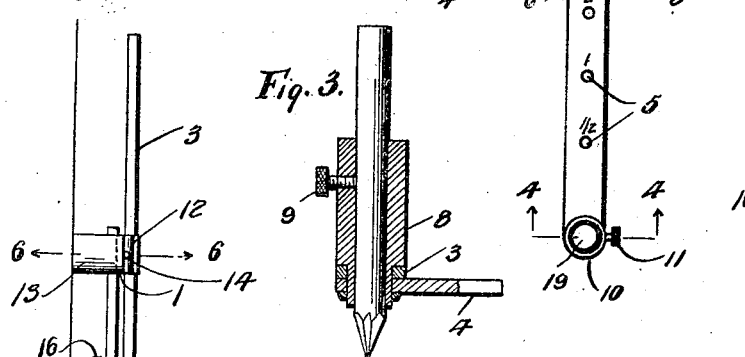
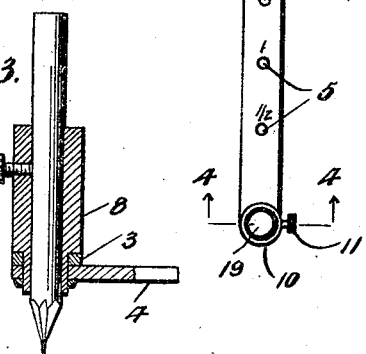
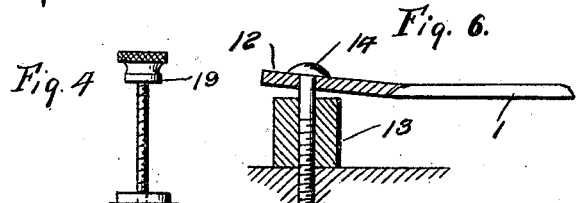
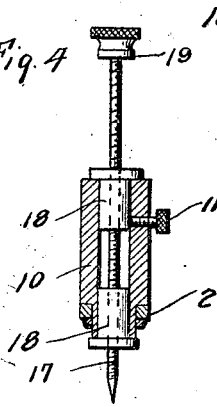
Inventor
H. C. Kay.
By
Attorney Patented Sept. 9, 1924.

1,508,280

UNITED STATES PATENT OFFICE.

HUGO C. KAY, OF CINCINNATI, OHIO.

PANTOGRAPH.

Application filed May 8, 1923. Serial No. 637,557.

*To all whom it may concern:*

Be it known that I, HUGO C. KAY, a citizen of the United States, residing at Cincinnati, in the county of Hamilton and State of Ohio, have invented certain new and useful Improvements in Pantographs; and I do hereby declare the following to be a full, clear, and exact description of the invention, such as will enable others skilled in the art to which it appertains to make and use the same.

The invention relates to a drafting appliance whereby to facilitate the copying of matter to be reproduced and whereby the copy may be enlarged or reduced as required.

The invention has for its object the provision of a pantograph which may be readily and accurately adjusted and which may be conveniently used when making a copy of any design or matter to be reproduced.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a top plan view of a pantograph embodying the invention,

Figure 2 is an end view thereof,

Figure 3 is a section on the line 3—3 of Figure 1,

Figure 4 is a detail section on the line 4—4 of Figure 1,

Figure 5 is a detail view of one of the supporting feet shown applied to one of the pantograph bars, the bar being shown in section.

Figure 6 is a detail section on the line 6—6 of Figure 2, and

Figure 7 is a similar view taken on the line 7—7 of Figure 1.

Corresponding and like parts are referred to in the following description and designated in the several views of the drawings by like reference characters.

The pantograph comprises a plurality of bars 1, 2, 3 and 4 arranged to cross one another and pivotally connected at the point of crossing. These bars are provided in their length with openings 5 for reception of the pivot connections 6 and these openings are numbered or otherwise calibrated to admit of setting the instrument according to the size of the copy so that the same may be enlarged or reduced to the required scale. The bars 1 and 2 are pivotally connected at one end, as indicated at 7, said pivot preferably consisting of a rivet. The bars 3 and 4 are pivotally connected at one end by means of a tube 8, the latter having its lower end reduced and secured in an opening of the bar 4 and passing loosely through an opening formed in the bar 3. A set screw 9 is threaded into an opening formed in a side of the tube 8 and serves to secure a pencil or other marker or stylus, as occasion may require. A similar tube 10 is secured in an opening formed in the end of the bar 2 and has a set screw 11 threaded into a lateral opening.

The end of the bar 1 opposite that receiving the pivot 7 is bent as indicated at 12 and a short tube 13 is disposed beneath the bent end and receives a screw 14 or other fastening whereby the instrument is pivotally connected at one end to a board, table or other supporting surface. The pivot connections 6 are in the nature of bolts and receive knurled thumb nuts.

The feet 15 are employed on large instruments only, and the strips 1 and 2 in this event, are tapped and the feet which consist of short pins or studs having their lower ends rounded to glide readily over the surface, are threaded into the tapped openings of the strips 1 and 2, the feet being clamped to the strips by the lock nuts 16 which prevent the pins from working loose.

The tracing stylus 17 is threaded and receives flanged nuts 18 which are adapted to be fitted into opposite ends of either one of the tubes 8 or 10, accordingly as the copy is to be reduced or enlarged. A head 19 at the upper end of the stylus 17 enables the latter to be turned whereby to effect adjustment thereof. The body of the nut 18 enters the tube, whereas the flange engages the end thereof. The upper flange nut may be secured by the set screw 9 or 11 and the lower flange nut may be turned so as to clamp the tube between the outer flanged ends of the nut as will be readily understood. When the stylus 17 is fitted to one or the other of the tubes 8 and 10, the pencil or marker is applied to the other tube.

It is to be understood, that the entire pantograph is constructed of metal, and will therefore be a durable instrument capable of sustaining hard usage. Also, the tapped openings 5 of the strips 1 and 2 will retain their threads for an indefinite period of time owing to the fact that all the strips, are constructed of metal.

What is claimed is:

1. A pantograph comprising bars pivoted together to form a jointed parallelogram, the said bars extending beyond one pair of diametrically opposite pivots, a tube at the outer free end of one of the bars to receive a stylus, and a tube pivotally connecting two of the remaining bars and adapted to receive a stylus, flanged nuts adapted to be fitted in opposite ends of either one of said tubes, and a threaded stylus coacting with the flanged nuts to secure the same to the tube.

2. A pantograph comprising bars pivoted together to form a jointed parallelogram, the said bars extending beyond one pair of diametrically opposite pivots, a tube pivotally joining two of said bars, a nut fitted in the upper end of said tube, means to secure said nut against rotation, a nut fitted in the lower end of the tube and having a flange adapted to engage the lower end of the tube, and a stylus extending through said tube and threaded in said nuts.

In testimony whereof I affix my signature in presence of two witnesses.

HUGO C. KAY.

Witnesses:
 JOHN V. BRYANT,
 FRANK KAY.